United States Patent [19]

Bain

[11] Patent Number: 5,164,713
[45] Date of Patent: Nov. 17, 1992

[54] CURSOR POSITION CONTROLLER FOR USE WITH MOUSE AND DISPLAY SYSTEMS

[76] Inventor: Lee L. Bain, 4105 Stonewick Dr., Arlington, Tex. 76016

[21] Appl. No.: 776,187

[22] Filed: Oct. 15, 1991

[51] Int. Cl.⁵ .............................................. G09G 3/02
[52] U.S. Cl. .................................. 340/710; 340/706; 340/709
[58] Field of Search ................ 340/706, 709, 710, 712

[56] References Cited

U.S. PATENT DOCUMENTS

| | | | |
|---|---|---|---|
| 3,729,129 | 4/1973 | Fletcher et al. | 340/709 |
| 4,190,834 | 2/1990 | Doornink | 340/709 |
| 4,369,439 | 2/1990 | Broos | 340/706 |
| 4,927,987 | 5/1990 | Kirchgessner | 340/209 |
| 5,047,754 | 9/1991 | Akatsuka et al. | 340/710 |
| 5,075,673 | 12/1991 | Yanker | 340/709 |

Primary Examiner—Ulysses Weldon
Assistant Examiner—Amare Mengistu
Attorney, Agent, or Firm—Richards, Medlock & Andrews

[57] ABSTRACT

Improved cursor-positioning apparatus is disclosed for use with a mouse-type cursor controller and a host computer display system to enable the mouse's operating area to remain relatively small, yet enabling normal-feeling mouse operation to provide both high-precision cursor pointing and very efficient coarse positioning of the cursor to any zone of a relatively larger display area. The disclosed apparatus provides an ideally limited operative-area for the attached mouse, comprising structure for defining a boundary limiting the range of X-Y movement of the mouse when it is operated within such contained operative-area. The apparatus also comprises elements that sense orthogonal forces that result when the travel of the mouse is limited by such structural boundaries, elements for synthesizing appropriate cursor-movement signals upon activation by the sense of such forces during mouse/boundary contact and elements for selectively coupling either such synthesized signals or normal mouse-generated signals to the host computer system.

8 Claims, 4 Drawing Sheets

CURSOR POSITION CONTROLLER FOR USE WITH MOUSE AND DISPLAY SYSTEMS

TECHNICAL FIELD OF THE INVENTION

This invention relates generally to the field of computer input devices, and more particularly to devices used to position a cursor on a computer-controlled display. In particular, this invention relates to a cursor-position controller device to be used in conjunction with a mouse-type cursor control system and a computer display system.

BACKGROUND OF THE INVENTION

Modern computers/workstations use various forms of pointing devices to facilitate the positioning of a cursor on the display screen. A commonly known form of such a pointing device is the "mouse". The mouse is a hand-held device that, when moved about a work surface (e.g., a desk-top), causes a corresponding movement of a cursor on the computer's video display. Such mouse-type systems are disclosed by U.S. Pat. Nos. 3,892,963; 3,541,521; 4,464,652 and 4,546,347.

The mouse is a very popular cursor-pointing device, particularly for graphics-interactive applications; e.g., CAD (Computer Aided Design), where frequent and precise cursor positioning is essential.

The mouse is most precise as a pointing device when the distance that the cursor is moved on the display is the same as or less than the distance that the mouse is moved on the work surface.

A disadvantage of common mouse cursor control devices found in prior art is the fact that the user is distracted by interruptions in cursor control when mouse travel exceeds the operative area available for reliable mouse operation; e.g., the mouse runs off the edge of its pad or collides with other desk-top objects in the vicinity. Furthermore, the re-centering of the mouse within its operative area without disturbing the position of the cursor requires the mouse to be lifted off the work surface; such frequent action causes a significant increase in operator hand/arm fatigue. As the display area of modern computer/workstations increase in size, the above-mentioned disadvantages grow worse and the following problems are encountered: 1) where the mouse's operative area (domain) is simply increased proportional to the larger display area, valuable work space (desktop) is displaced by the larger mouse domain and even more important is the fact that operator hand/arm fatigue is increased because of the resulting longer movements of the mouse; 2) where the mouse domain is kept to a more practical (smaller) size, the distance that the cursor can be moved in a particular direction by a single movement (stroke) of the mouse is limited; therefore, longer cursor movements require multiple mouse strokes in a particular direction that increase operator hand/arm fatigue caused by the necessity to lift the mouse off the work surface during the retrace of each of the multiple strokes of the mouse; 3) where a ratio of mouse movement to cursor movement is chosen such that the cursor range is significantly larger than the mouse range, cursor precision suffers; that is, the cursor becomes overly sensitive or jumpy in response to small mouse movements, causing precise cursor placement to be very difficult or impossible.

Clearly, for larger display applications, it would be advantageous to provide means to enable mouse operation to efficiently move the cursor to any zone of a large display, yet enable the mouse's operative area to remain relatively small while retaining an ideal ratio of mouse movement to cursor movement for precise cursor positioning. Furthermore, it would be advantageous for such a means to extend the effectiveness of the host system's existing mouse system and, therefore, to not require replacement or modification of the existing mouse so that implementation of such means may be most economical. Furthermore, it would be advantageous for such a means to be applicable to any type of mouse (e.g., mechanical, optical) or any type of mouse/host interface (e.g., parallel, serial). Furthermore it would be advantageous for the implementation of such means to be transparent to any existing system operation; that is, implementation should not require any modification of any of the host system's existing hardware or software. Furthermore, installation and operation of such implementation should be simple.

As will be disclosed below, the present invention provides an improved cursor control system that is used in conjunction with the common mouse-type cursor control system to extend the effectiveness of the operation of the attached mouse to overcome the above-mentioned disadvantages of the prior art and to provide the above-mentioned advantages, particularly where used with display systems with relatively large viewing area.

SUMMARY OF THE INVENTION

This invention provides improved cursor-positioning apparatus for use with a mouse-type cursor controller used with a host computer/workstation display system. The apparatus provides an ideally limited operative area for the associated mouse, comprising means for defining a boundary to limit the range of X-Y movement of the mouse operated within this provided operative area. The apparatus also comprises means for sensing orthogonal forces from contact of the mouse with such boundaries when travel of the mouse becomes limited by such boundaries during operation within the said bounded operative area; means for synthesizing appropriate cursor-movement signals upon activation by the sense of said orthogonal force during mouse/boundary contact; and means for selectively coupling either such synthesized X-Y movement signals or normal mouse-generated signals to the host computer system.

The key difference between the apparatus of the present invention and prior art is that the present system enables the operation of a standard mouse to control the positioning of the cursor in two distinctly different modes: 1) normal, short-range, precise cursor positioning is enabled while the mouse is operated within (not contacting) the boundaries of the mouse's given operative area of the apparatus; 2) more efficient, longer-range, coarse cursor positioning is enabled when the mouse is operated to contact and exert orthogonal force upon the boundaries of the mouse's given operative area, of the apparatus.

The key advantage of the present invention over prior art is that, even with large display applications, the mouse's operative area can remain relatively small, yet normal-feeling mouse operation can provide, in addition to normal precise cursor control, very efficient coarse positioning of the cursor to any zone of a large display. Accordingly, reduced operator hand/arm fatigue and reduced operator distraction are the key yielded advantages.

BRIEF DESCRIPTION OF THE DRAWINGS

The advantages and features of the invention will become more apparent with reference to the following detailed description of a presently embodiment thereof in connection with the accompanying drawings, wherein like reference numerals have been applied to like elements, in which.

DETAILED DESCRIPTION

Figure 1:
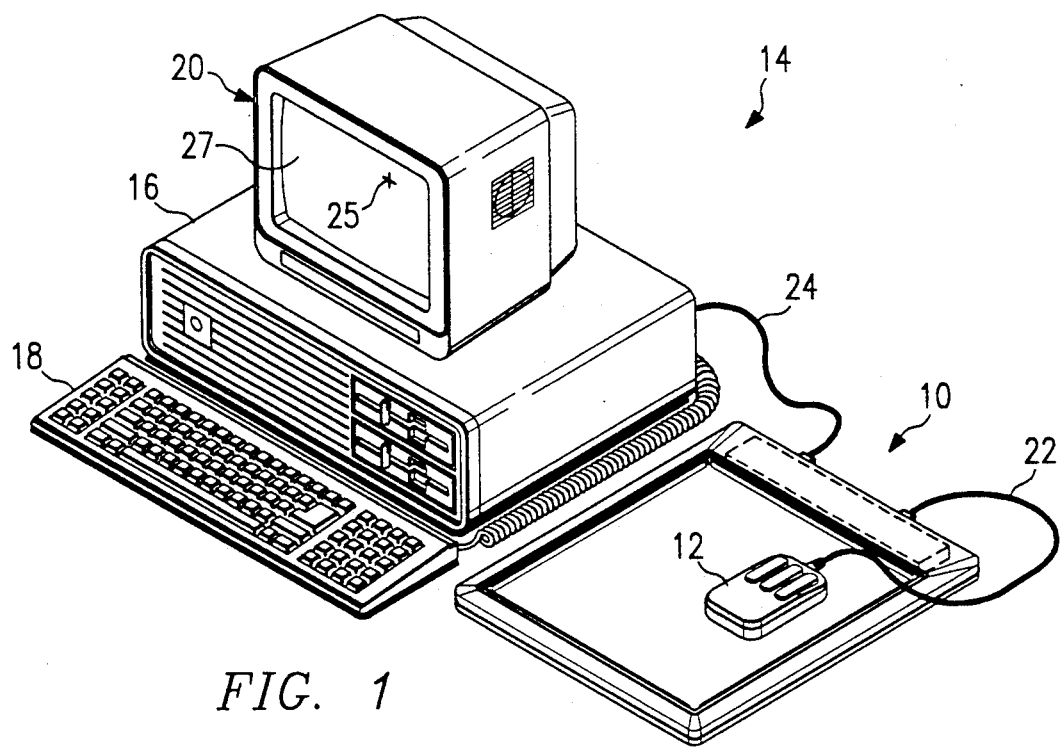
FIG. 1 is a simplified pictorial illustrating a computer system with a mouse-type cursor controller operatively connected by way of a cursor-position controller device constructed in accordance with the present invention.

Referring to the drawing and FIG. 1 in particular, shown therein and generally designated by the reference character 10 is the cursor-position controller or controller unit that is constructed in accordance with this invention. The controller unit 10 is shown operatively connected between a mouse-type cursor control device or mouse 12 and a typical computer/workstation system or computer system 14 which includes a main processor unit 16, a keyboard unit 18 and a video display unit 20. The mouse 12 is operatively connected to the controller unit 10 by cable 22 while controller unit 10 is operatively connected to the computer system 14 by cable 24.

As with prior art, mouse-resident transducers sense any X-Y positional movement of the mouse 12 and cause mouse-resident electronics to generate corresponding X-Y position-change signals which are processed by computer system 14 to cause a corresponding update of the X-Y position of the cursor 25 on the viewing area of screen 27 of the video display unit 20. In accordance with the present invention, the mouse 12 is operated within the structure of the controller unit 10 where the range of X-Y travel of the mouse 12 is limited by the structural boundaries of controller unit 10 and where the sense of such travel limit causes electronics within controller unit 10 to synthesize corresponding X-Y movement signals that causes additional extended coarse movement of cursor 25 during such mouse/-boundary contact.

Figure 2:
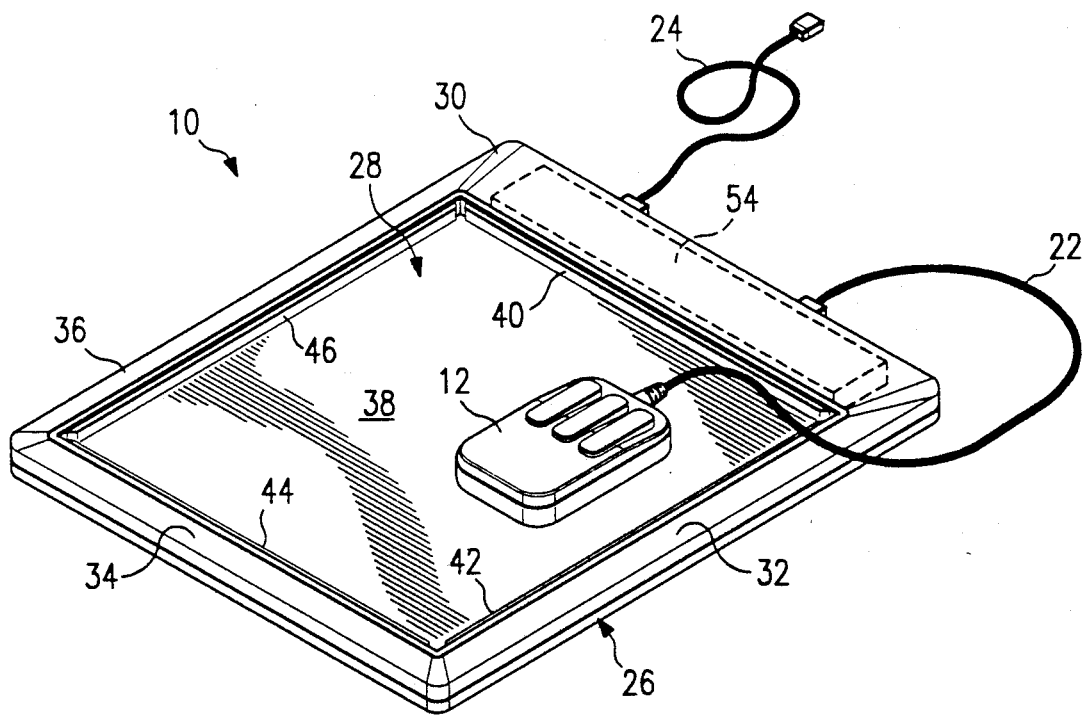
FIG. 2 is a simplified right-handed perspective view of a cursor-position controller device constructed in accordance with the present invention.

With reference to FIG. 2, cursor-position controller 10 comprises a framework 26 forming an enclosed operative area 28 within which operation of mouse 12 is limited in range of movement. Framework 26 comprises a first wall or raised section 30, a second wall or raised section 32, a third wall or raised section 34, and a fourth wall or raised section 36 which are positioned to form the limited operative area or travel zone 28 in the shape of a rectangle. Flat surface 38 of framework 26 provides the work surface or surface of movement for the mouse 12. With the prior art, the work surface for mouse 12 may be any available desktop area or a special friction pad for a mechanical-type mouse, or it may be a special patterned pad for an optical-type mouse. In accordance with this invention, surface 38 may comprise or contain or support any such special surface or pad associated with mouse 12. Alternate embodiments could include controller unit 10 as an integral part of the host system; e.g., built into the keyboard. It will be appreciated that the four walls of framework 26 provide a means for defining a boundary limiting the range of movement of the mouse 12 along the X axis (X+ and X−) and along the Y axis (Y+ and Y−).

The inside surface of the walls of framework 26 includes sensors for detecting contact of mouse 12 with a first sensor 40 on first wall 30, a second sensor 42 on second wall 32, a third sensor 44 on third wall 34, and a fourth sensor 46 on fourth wall 36. In the preferred embodiment, the sensors are pressure-sensitive switches so that activation requires a finite orthogonal force that filters out incidental and unintentional contact of the mouse and also provides the user with some tactical feedback of sensor activation. Alternate embodiments could use an optical switch arrangement, etc. The sensors could be located in the four edges of the mouse 12, however, the present invention locates the sensors in framework 26 so the present invention can be implemented with existing standard mouse devices without requiring modification to same. It will be appreciated that the four sensors detect contact of the mouse 12 when mouse 12 reaches any of the four X-Y limits of travel zone 28.

In operation, mouse 12 can be moved freely anywhere within zone 28 for normal "pointing" mode of operation. As long as there is no detectable contact of mouse 12 with any of the sensors 40, 42, 44, or 46, X-Y movement of mouse 12 causes a direct corresponding X-Y movement of the cursor 25 within a zone of the viewing area 27 which is generally equal to the size of travel zone 28. When a longer movement of cursor 25 is attempted, the travel of mouse 12 reaches the limit of travel zone 28 and further movement of the mouse 12 in the given X-Y direction is restrained and the resulting orthogonal force is sensed by the contacted sensor which causes the associated electronics 54 (see FIG. 7) of controller 10 to switch to a different mode of mouse/cursor action to be explained in detail below.

Figure 3:
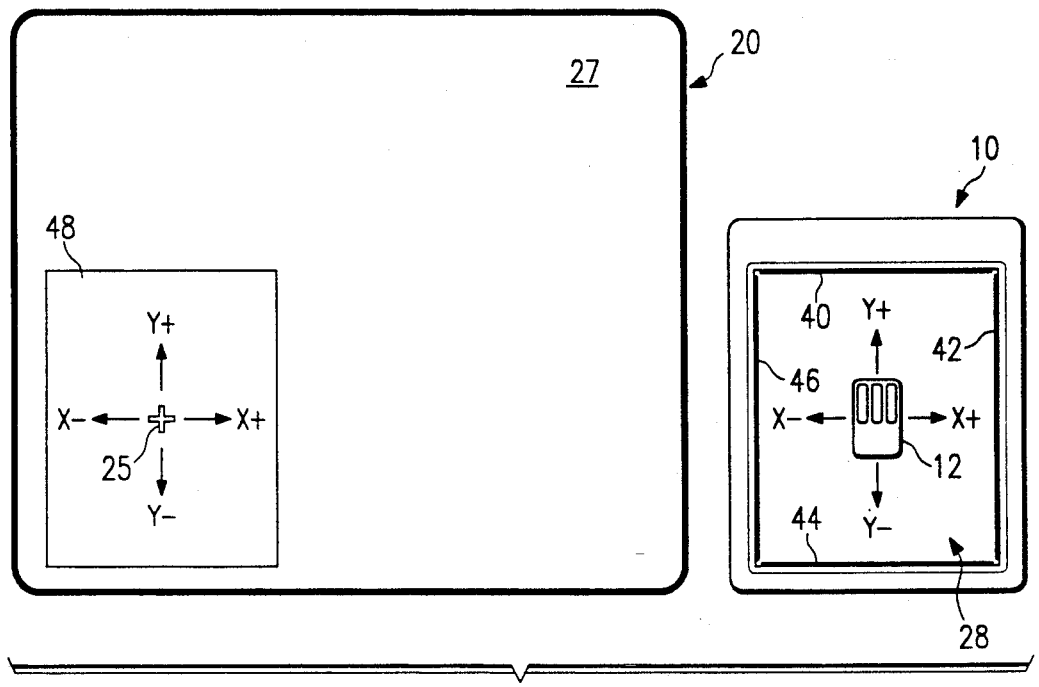
FIGS. 3, 4, 5 and 6 illustrate the movement of a cursor in response to cooperation of the mouse-type cursor controller and a cursor-position controller device constructed in accordance with the present invention.
Figure 4:
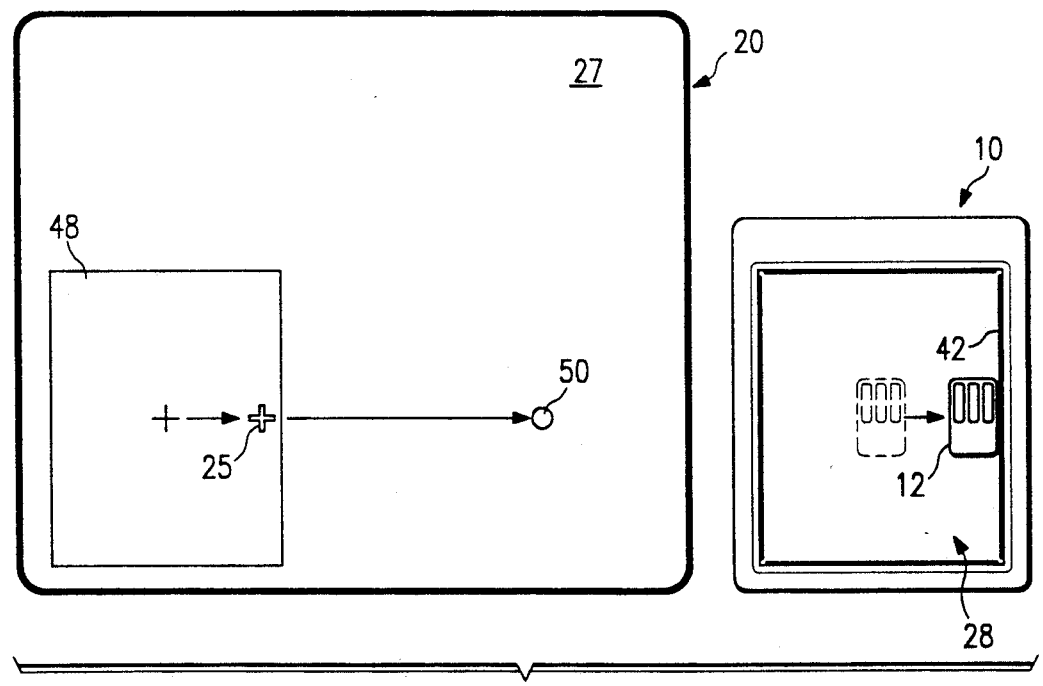
Figure 5:
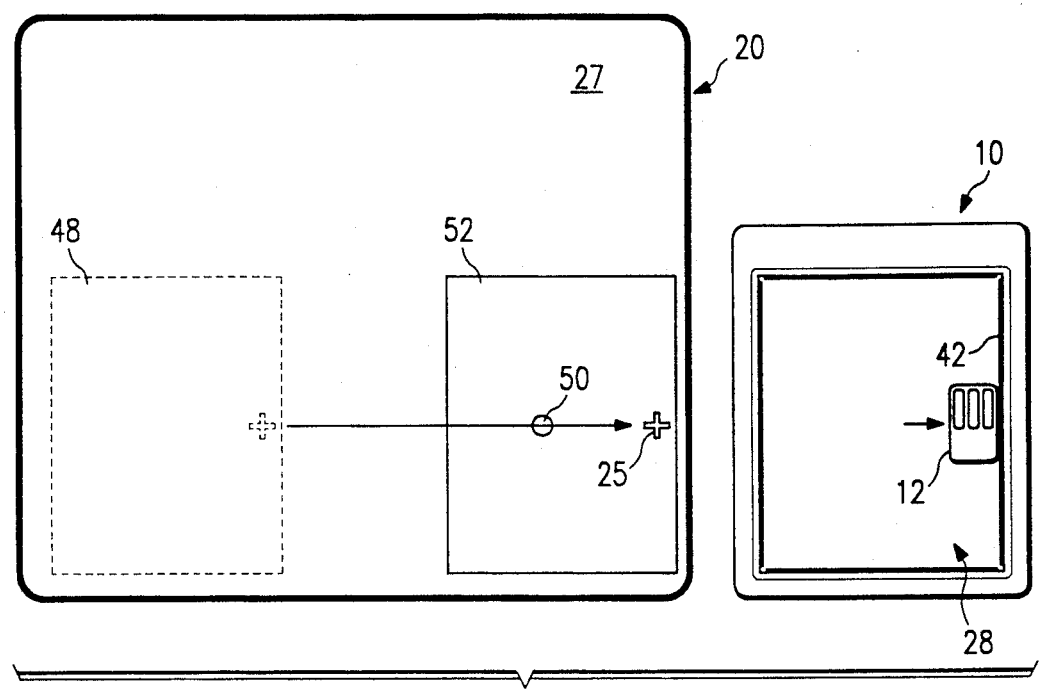
Figure 6:
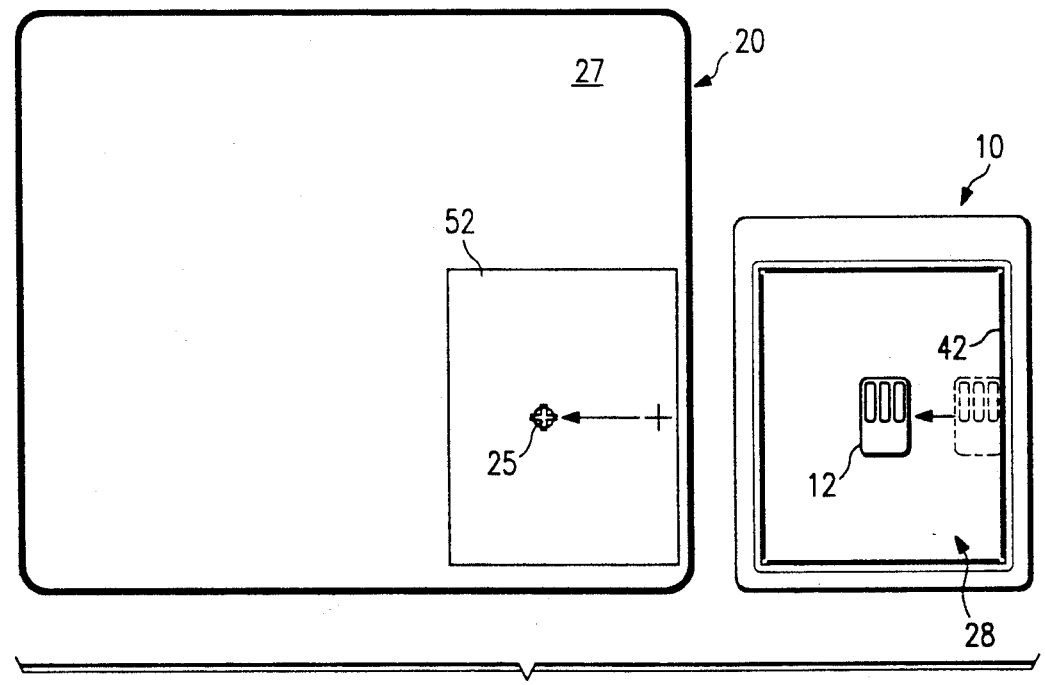

FIGS. 3-6 illustrate the automatic transition of operation between the normal high-resolution "pointing" mode and the more coarse "pushing" mode of cursor control. FIG. 3 shows the mouse 12 arbitrarily centered within the travel zone 28 and the cursor 25 arbitrarily centered within the current cursor zone 48 of video display 20. The cursor can be positioned precisely to any point within the current cursor zone 48 by normal "pointing" movement of the mouse 12. FIG. 4 illustrates an attempt to move the cursor 25 to target location 50 which is beyond the current cursor zone 48. Normal mouse/cursor movement occurs in the X+ direction until the travel of the mouse 12 is limited and contact is detected by second sensor 42. Such sense of mouse/boundary contact causes the associated electronics 54 of controller 10 to generate a repetitive X+ movement signal that mimics X+ movement of the mouse 12 which causes cursor 25 to continue movement in the X+ direction for as long as the X+ force of the restrained mouse 12 is maintained against sensor 42 as illustrated by FIG. 5. FIG. 6 shows the cursor 25 now "pushed" from its previous zone into a new current zone 52 and normal mouse/cursor "pointing" action is automatically restored by the termination of mouse/- sensor contact as the mouse 12 is moved away from second sensor 42 to position cursor 25 toward the center of the new zone 52. Similar mouse/cursor action occurs relative to movement/restrictions in the other three X-Y directions. In operation, just as the user has the feel that the cursor is "pointed" precisely by mouse movement, likewise, the user has the feel that the cursor, and its current zone, is "pushed" coarsely about the relatively larger display area by the natural-feeling force resulting when mouse travel is restrained.

Figure 7:
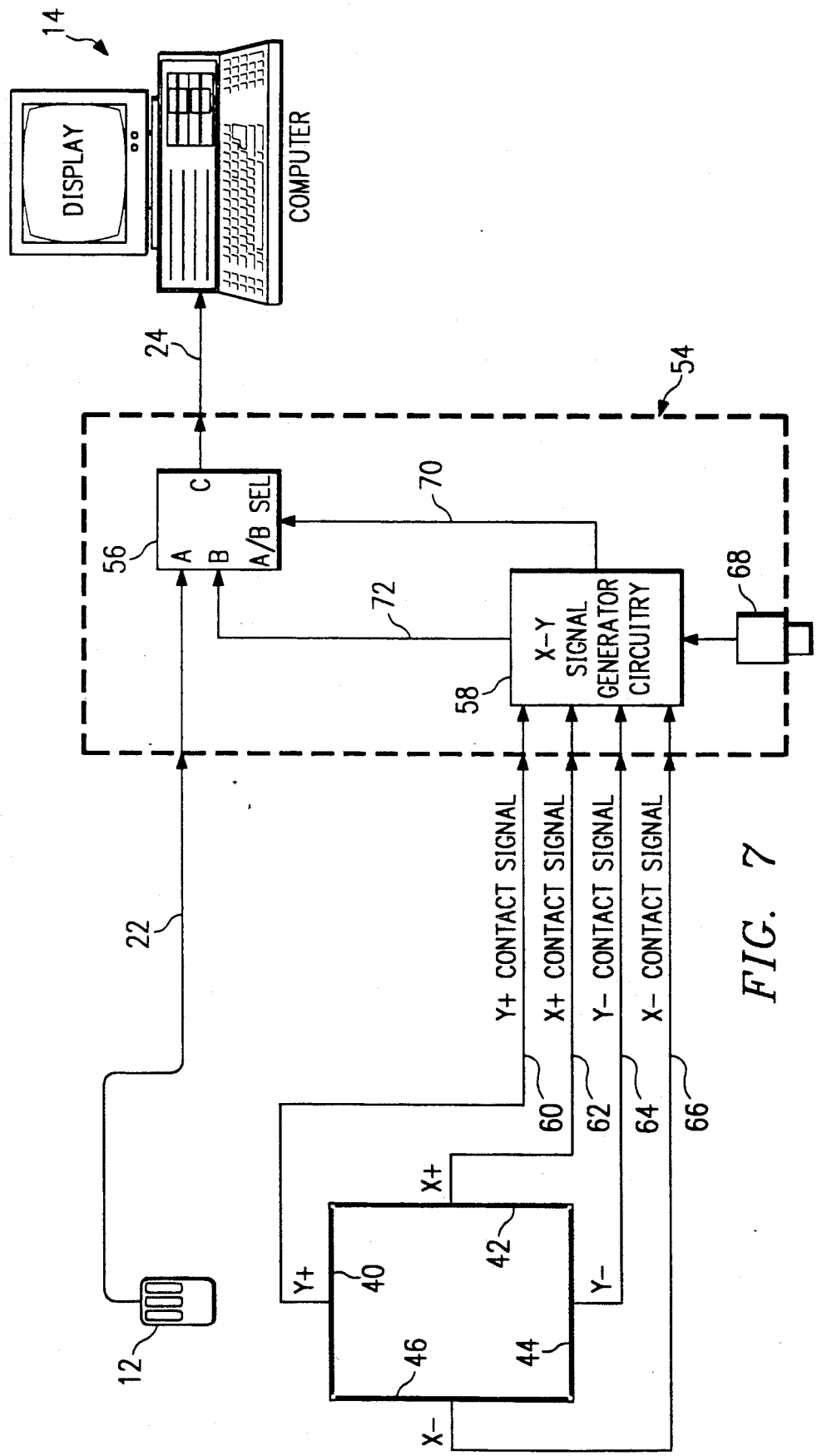
FIG. 7 is a simplified block diagram of a cursor-position-controller device, constructed in accordance with the present invention, showing exemplary electronics and the interface with the mouse and a computer and display system.

With reference to FIG. 7, a simplified block diagram shows the controller electronics assembly 54 and its interface with the mouse 12, the X-Y boundary sensors 40, 42, 44, and 46, and the host computer system 14. By way of example to simplify the explanation of operation, electronics assembly 54 is shown to comprise, primarily, an A/B-to-C path selector 56 and an X-Y signal generator 58. Normal mouse-generated signals are coupled to the electronics assembly 54 and the "A" input of the path selector 56 via the standard mouse interface cable 22. The "B" input of path selector 56 is driven by signal generator 58 output signal path or synthesized X-Y movement signal path 72. The "A/B SEL" input of path selector 56 is controlled by the signal generator 58 output signal or path selector control signal 70. The "C" output of path selector 56 drives the host interface cable 24. The four X-Y boundary sensor contact signals are connected to assembly 54 and the inputs of X-Y signal generator 58 via corresponding leads 60, 62, 64 and 66.

The mouse/host interface signal paths 22 and 24 are illustrated as busses for simplicity; in reality they will include at least three wires (common, power, and signal) for a serial-type interface and at least six wires (common, power, and four signals) for a parallel-type interface. In any case, electronics assembly 54 is plug-in configurable to provide appropriate circuitry for the given type of mouse/host interface.

Activation of any of the four sensors will enable the signal generator circuitry 58 to produce a corresponding X-Y movement signal on path 72 and will cause path selector control signal 70 to be active so that the synthesized X-Y movement signal path 72 is coupled via the B-to-C path of selector 56 to the host computer system 14 via cable 24. Otherwise, when none of the four sensors are activated, path-selector control signal 70 is inactive so that the normal mouse signal path 22 is coupled via the A-to-C path of selector 56 to the host computer system 14 via cable 24. Inasmuch as the particular circuitry of signal generator 54 will be apparent to those skilled in the art, the details are not included herein, however, it will be appreciated that, for a given type of client mouse 12, such circuitry will be similar to the cursor-movement signal generation circuitry of the client mouse 12. Also, it will be appreciated that activation of cursor-movement signal generation circuitry 58 by sensors 40, 42, 44 and 46 that detect the orthogonal force of mouse 12 in the four X-Y directions is analogous to activation of the cursor-movement signal generation circuitry of mouse 12 by transducers in mouse 12 that detect the movement of mouse 12 in the four X-Y directions. Activation of second sensor 42 will cause the generation of a signal identical to that produced by mouse 12 during movement in the X+ direction. Activation of fourth sensor 46 will cause the generation of a signal identical to that produced by mouse 12 during movement in the X— direction. Activation of first sensor 40 will cause the generation of a signal identical to that produced by mouse 12 during movement in the Y+ direction. Activation of third sensor 44 will cause the generation of a signal identical to that produced by mouse 12 during movement in the Y— direction. The appropriate synthesized X-Y movement signal is generated, repetitively, for as long as the corresponding sensor remains activated. The rate at which the synthesized signal is repeated (and therefore, the rate at which the cursor moves during "pushing" mode) is user-adjustable via the rate control input 68.

Thus, an improved cursor positioning control system has been described that extends the effectiveness of the common mouse-type cursor control system.

Although the present invention has been described with reference to a presently preferred embodiment, it will be appreciated by those skilled in the art that various modifications, alternatives, variations, etc., may be made without departing from the spirit and scope of the invention as disclosed above and as defined in the appended claims.

I claim:

1. Apparatus for use with a mouse-type cursor controller and a host computer and display system, said apparatus comprising:
   means for defining a boundary limiting the X-Y movement of the mouse when said mouse is positioned within said means for defining a boundary;
   means for detecting contact between said mouse and said means for defining a boundary;
   means for generating cursor-movement signals upon activation by said means for detecting contact;
   means for electrically coupling said generated cursor-movement signals from said means for generating to the host computer and display system; and
   means for electrically coupling signals from said mouse to said host computer and display system.

2. The apparatus of claim 1 wherein said means for defining a boundary comprises an X+ boundary, an X— boundary, a Y+ boundary and a Y— boundary.

3. The apparatus of claim 2 wherein said means for detecting contact comprises:
   a first sensor for detecting contact of said mouse with said X+ boundary;
   a second sensor for detecting contact of said mouse with said X— boundary;
   a third sensor for detecting contact of said mouse with said Y+ boundary; and
   a fourth sensor for detecting contact of said mouse with said Y— boundary.

4. The apparatus of claim 1 wherein said means for generating cursor-movement signals comprises configurable mouse compatible cursor-movement signal generation means.

5. The apparatus of claim 4 wherein said means for generating cursor-movement signals comprises a user-adjustable repetition rate control means.

6. The apparatus of claim 1 wherein said means for electrically coupling said generated cursor-movement signals is selected by the presence of detection of contact by said means for detecting contact.

7. The apparatus of claim 1 wherein said means for electrically coupling said signals generated by said mouse is selected by the absence of detection of contact by said means for detecting contact.

8. The apparatus of claim 3 wherein said first sensor, said second sensor, said third sensor, and said fourth sensor comprises separate pressure-sensitive switches.

* * * * *